United States Patent [19]
Hamby et al.

[11] Patent Number: 5,814,824
[45] Date of Patent: Sep. 29, 1998

[54] COMPOSITE THERMAL INSULATION AND RADIOACTIVE RADIATION SHIELDING

[75] Inventors: Peter N. Hamby, Lansing; Frank P. Polak, Joliet; David E. Olson, LaGrange Park; Edward J. Wolbert, Lisle, all of Ill.; Bruce J. Alpha, Valparaiso, Ind.; Bryan L. Risley, Streator, Ill.

[73] Assignees: Commonwealth Edison Company, Chicago, Ill.; Electric Power Research Institute, Inc., Palo Alto, Calif.; Sargent & Lundy, LLC; Transco Products, Inc., both of Chicago, Ill.

[21] Appl. No.: 701,388

[22] Filed: Aug. 22, 1996

Related U.S. Application Data

[63] Continuation of Ser. No. 559,470, Nov. 15, 1995, abandoned.

[51] Int. Cl.[6] .................................................. G21C 11/00
[52] U.S. Cl. ...................................... 250/515.1; 250/506.1
[58] Field of Search ........................... 250/515.1, 506.1, 250/517.1, 518.1, 519.1; 376/272; 220/611

[56] References Cited

U.S. PATENT DOCUMENTS

| | | | |
|---|---|---|---|
| 2,928,948 | 3/1960 | Silversher | 250/515.1 |
| 3,061,491 | 10/1962 | Theorard et al. | 250/515.1 |
| 3,648,734 | 3/1972 | Waite et al. | 138/113 |
| 3,785,407 | 1/1974 | Waite et al. | 138/108 |
| 3,818,949 | 6/1974 | Johnson | 138/158 |
| 3,879,910 | 4/1975 | Waite | 52/145 |
| 3,895,143 | 7/1975 | Tarlow | 250/515.1 |
| 4,100,711 | 7/1978 | Skuran | 52/489 |
| 4,251,598 | 2/1981 | Waite | 428/603 |
| 4,303,553 | 12/1981 | Aoki et al. | 250/515.1 |
| 5,084,234 | 1/1992 | Hosgen | 250/515.1 |
| 5,334,806 | 8/1994 | Avery | 181/286 |
| 5,416,333 | 5/1995 | Greenspan | 250/515.1 |

OTHER PUBLICATIONS

Hill et al. "Coated lead shielding protects nuclear power plant workers," vol. 100 Power Engineering, pp. 28–31 (p. 29 does not appear to exist) (Sep. 1996).

Brochure: Darchem Engineering, Inc., "Darmet—All Metallic Insulation Outage and Backfit Services," received from Darchem, Nov., 1996 (14 sheets in brochure, some double-–sided).

Brochure: "Weir, Tile Weir Group PLC," Nov., 1994 (12 numbered pages).

Brochure: "The Weir Group PLC—Power," received from Darchem, Nov., 1996 (55 numbered pages).

ASTM C 667–92, Standard Specification for Prefabricated Reflective Insulation Systems for Equipment and Pipe Operating at Temperatures above Ambient Air (Aug., 1992).

Onitsuku, Hironori, "Radiation Exposure Reduction Program at Mitsubishi Heavy Industries," pp. 1–23 (REM Conference, U.S.A., 1992).

Cross–section of Sheet Lead Shielding (sheet 7 of 7). has no dated and no named.

"Drawing of Darmet and Lead Insulation" (denoted as p. 11). has no dated and named.

Two–page drawing entitled "Shielding." Has no date, name and no page.

"Y–Ray Shield Insulation Material" Jun. 23, 1993 pp. 2–10. has no named.

*Primary Examiner*—Kiet T. Nguyen
*Attorney, Agent, or Firm*—Brinks Hofer Gilson & Lione

[57] ABSTRACT

The present invention relates a composite insulation and shielding article and a method of permanently installing the composite article onto a system to provide at least radioactive shielding. The composite shielding for permanently reducing radioactive radiation emanating from a system comprises at least one inner layer, at least one outer layer, and a shielding layer between said inner and outer layers, said shielding layer comprising a shield material that reduces said radioactive radiation.

44 Claims, 2 Drawing Sheets

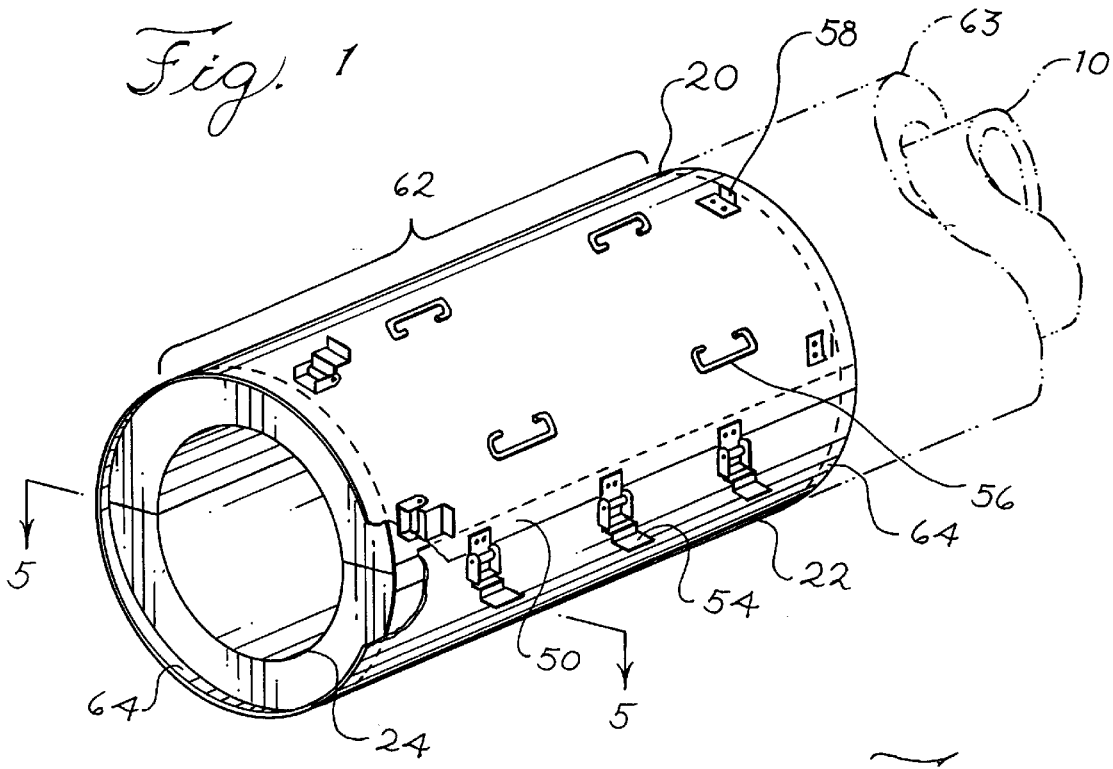
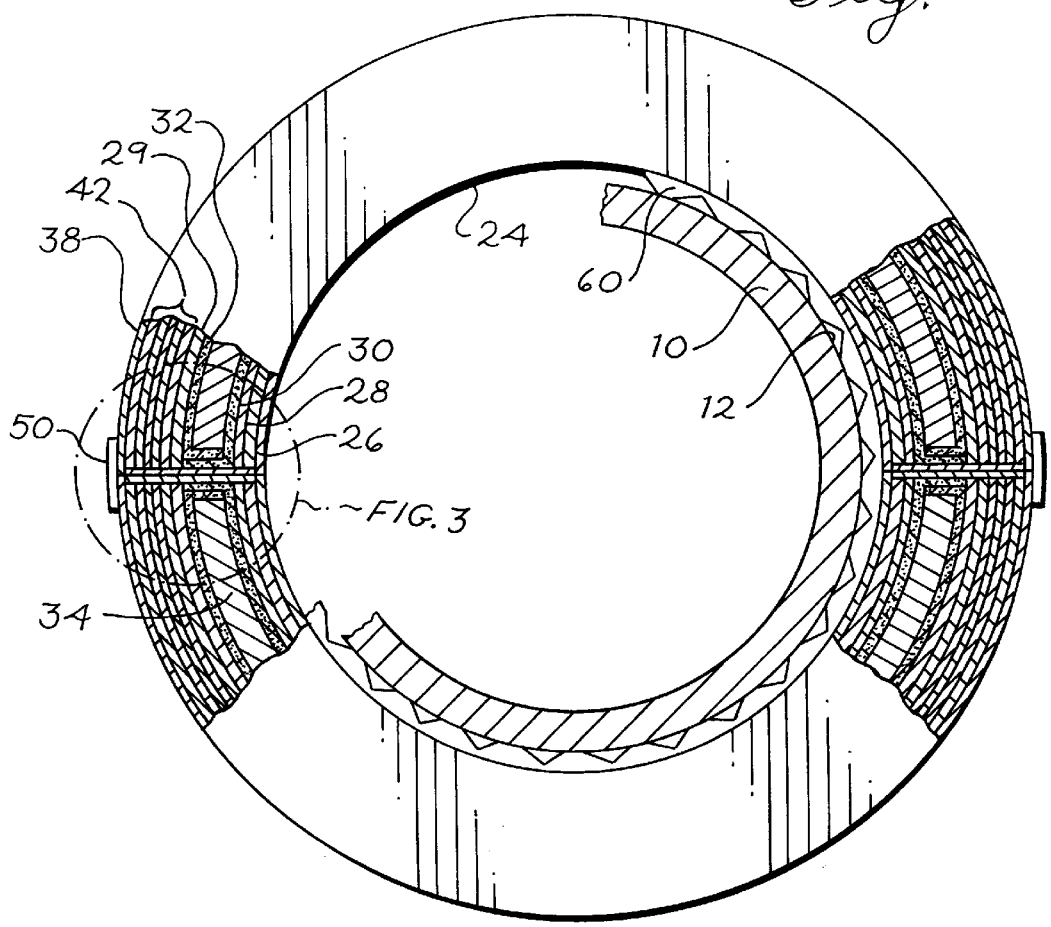

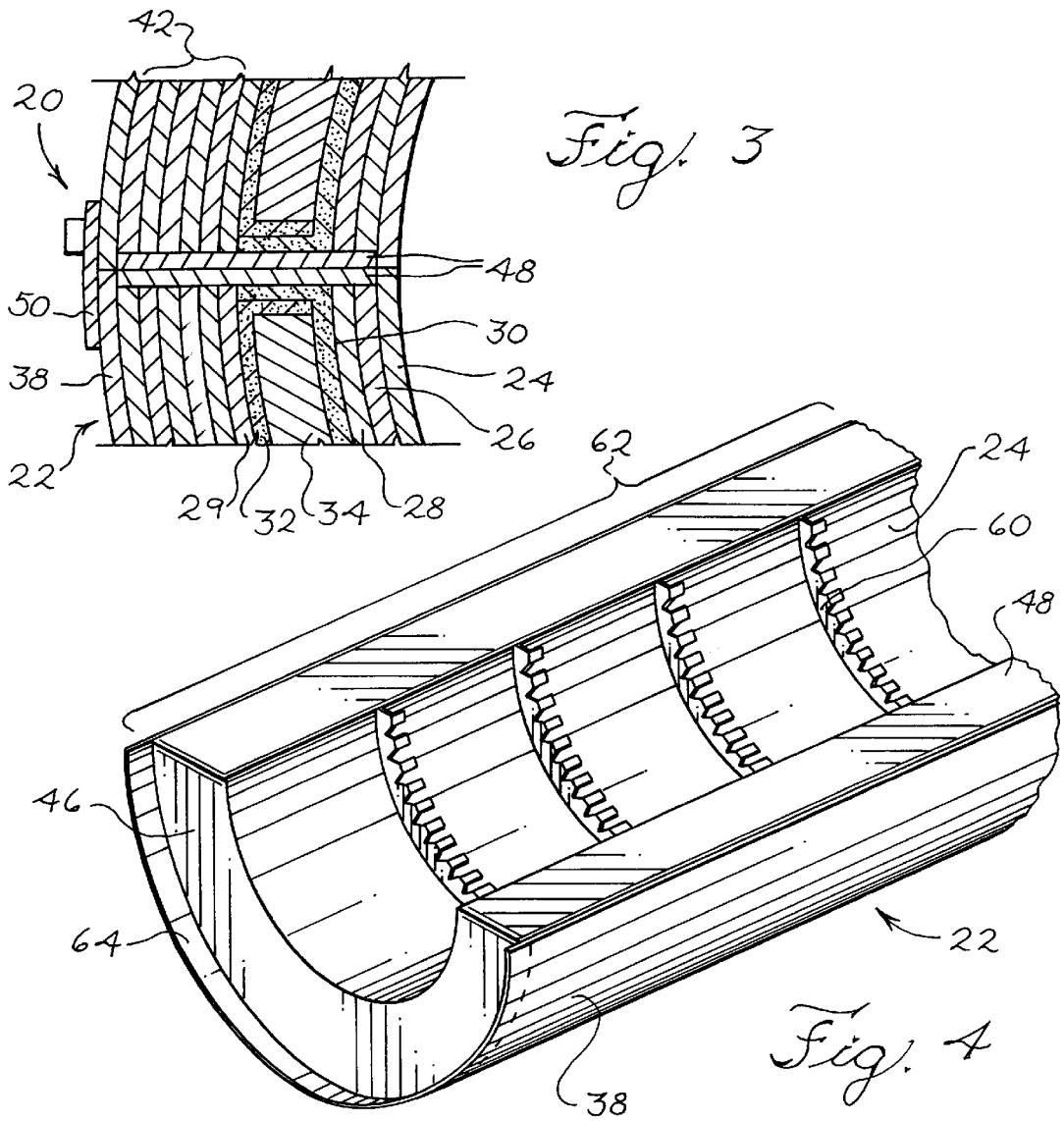
Fig. 3
Fig. 4
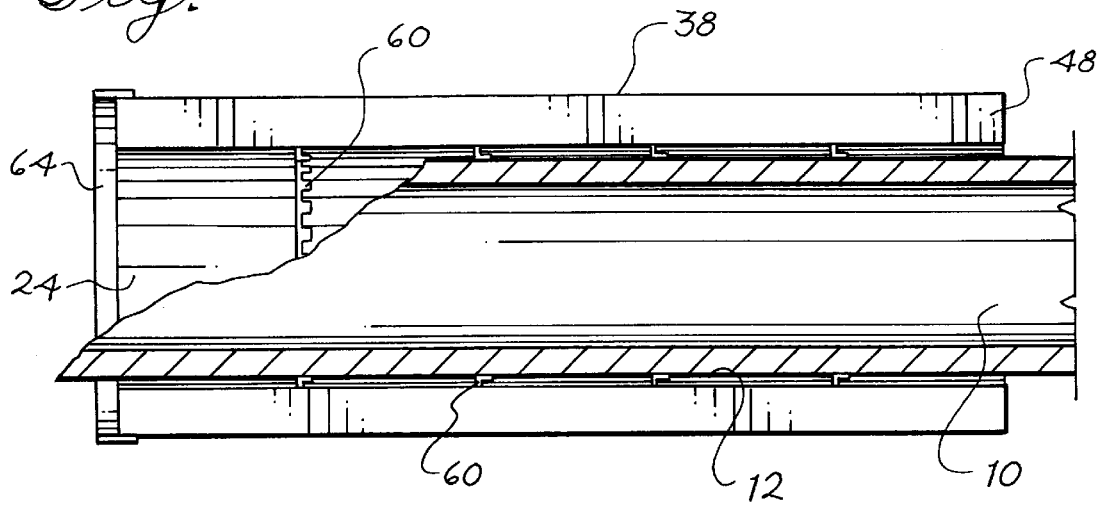
Fig. 5

COMPOSITE THERMAL INSULATION AND RADIOACTIVE RADIATION SHIELDING

CROSS-REFERENCE TO RELATED APPLICATION

This is a continuation application of U.S. application Ser. No. 08/559,470 filed Nov. 15, 1995, now abandoned, which application is hereby incorporated by reference.

BACKGROUND OF THE INVENTION

1. Field of the Invention

The present invention relates to insulations that maintain thermal efficiency, lower environmental temperatures and reduce radioactive radiation exposure to personnel and plant equipment and plant areas. In particular, the present invention relates to composite shieldings that can be permanently installed onto plant systems for nuclear reactor applications to thermally insulate plant systems as well as moderate and absorb neutrons, x-rays, gamma rays and other radioactive radiation from the system.

2. Description of the Related Art

Plant systems for nuclear reactor applications such as reactor fuel vessels, reactor fuel coolant, conduits and related components contain liquid streams at high temperature and high pressure. In addition, plant systems that are related to the reactor contain solid and liquid materials that continuously emit streams of neutrons, x-rays and gamma ray radiations in all directions that can penetrate all known materials, and give rise to harmful radioactivity, which causes damage to biological organisms as well as plant equipment. During nuclear power plant maintenance and operation, personnel are routinely subjected to continuous radiation fields emanating from neutron-, gamma-ray, and x-ray-emitting safety-related plant systems. Examples of safety-related components that require thermal insulation and that continuously emit radioactive radiation are the reactor vessel and related piping runs, heat exchangers, pumps, valves, tanks and other associated components. Safety-related plant systems are typically the primary contributors to personnel radiation exposure at nuclear power plants because of their high operational priority and close proximity to or direct contact with the reactor fuel core and coolant.

Historically, separate products have been used to provide thermal insulation and radioactive shielding. In addition, thermal insulations are permanently installed onto the systems while radioactive radiation shielding commonly has been installed temporarily during plant outage and removed thereafter.

For example, safety-related systems are usually covered with metallic insulation blocks or fiber-filled insulation blankets to ensure heat cycle thermal efficiency and to maintain lower environmental temperatures. However, these thermal insulations do not shield the effect of radioactive radiation. Safety-related systems are shielded on a temporary basis with flexible lead blankets containing lead draped over the plant system piping and components during a plant equipment outage. However, because of stringent United States regulatory requirements regarding design qualifications and the operability of nuclear safety-related plant systems related to the reactor fuel core and reactor core coolant, the lead blankets are removed before the plant system is returned to service. In addition, these blankets cannot withstand the high temperatures of the piping and components and tend to disintegrate if used during plant operation. Lateral and horizontal panels containing lead also have been installed in the vicinity of personnel access areas that are at risk of radiation exposure. However, these panels take up too much room and can usually only stay up for a limited span of time. Furthermore, lead sheets treated with coatings such as polyvinyl polymers have also been used. However, high temperature causes cracking in the coating, so that they disintegrate when exposed to heat.

Furthermore, because only temporary shieldings have been in use, the current practice in the industry has been to undergo a chemical decontamination process before an outage. This process is performed to reduce the amount of radioactive radiation emanating from a system in order to reduce radiation exposure to personnel. This chemical decontamination process is an added operation and maintenance cost.

From a regulatory plant design and qualification process, all structures attached to a safety-related plant system on a permanent basis must satisfy a number of regulatory concerns, such as seismic (earthquake) qualification, fire loading and material interaction with stainless steel.

Also, any effective shielding design is quite heavy, so that the design of any structures bearing this weight must be carefully evaluated.

Therefore, currently there has not been a product that can be installed on a permanent basis on a safety-related plant system to thermally insulate and provide shielding against radioactive radiation.

SUMMARY OF THE INVENTION

The present invention overcomes the disadvantages of existing thermal insulations and radioactive shieldings and provides a composite shielding article that significantly reduces at least radioactive radiation emanating from a system to allow safe access to the system's surroundings. When thermal insulation is unnecessary, the composite shielding of the present invention comprises at least one inner layer, at least one outer layer and a shielding layer between the inner and outer layers that comprises a shield material for reducing radioactive radiation. When the system requires both thermal insulation and radioactive shielding, the composite shielding of the present invention comprises at least one thermal insulation layer, at least one supporting layer and a shielding layer. In a preferred composite shielding, the shielding layer is located between at least one first supporting layer and at least one second supporting layer.

In a first preferred embodiment of the invention, the composite shielding attenuates radioactive gamma rays and/or x-rays that emanate from a system. The shielding layer consists essentially of lead and the composite shields further comprise barrier layers consisting essentially of a barrier material that prevents interaction between lead and the stainless steel in component layers and/or system surfaces. These barrier layers form an enclosure that substantially encase the shielding layer. The supporting layers contributes to substantially maintaining the functional integrity of the thermal insulation layers and the shielding layer.

In a second preferred embodiment, the composite shielding attenuates neutron radioactive particles emanating from a system. The shielding layer consists essentially of a shield material selected from the group consisting of high hydrogen-containing materials, high boron-containing materials and combinations thereof.

In a third preferred embodiment, the composite shielding attenuates both wave and particle forms of radiation wherein the shield material consists essentially of a combination of lead and materials containing a high level of hydrogen and/or boron.

The present invention also relates to a method for reducing at least radioactive radiation emanating from a system. In one embodiment, the method provides a composite shielding comprising a shielding layer between at least one inner and at least one outer layer on a permanent basis. In another embodiment, the method incorporates a radioactive radiation shielding and a thermal insulation into one product. In a preferred embodiment, these methods involve providing the composite shielding in a plurality of segments and a plurality of half cylindrical sections. End pieces are provided at the terminal ends of each segment and sections. Circumferential laps are provided at one terminal end of each segment and longitudinal laps are provided at both terminal ends of each section to cover the seams between adjoining segments and sections. These segments and sections can be permanently installed onto a system such as a nuclear reactor coolant recirculation piping with fasteners securing the sections and segments. The preferred composite shielding does not deteriorate at the operating temperature of the system and can withstand seismic levels measuring at least up to about 7 G (gravity units). Furthermore, the overall size of the composite shielding can be provided to be substantially equal to that of the presently available thermal insulation articles, so that it can be permanently installed onto the system without modification and provide permanent radiation and thermal protection. Moreover, the effectiveness of the shielding reduces radioactive radiation exposure to such a degree such that future Reactor Recirculation System chemical decontaminations can be eliminated.

The invention itself, together with further objects and attendant advantages, will be best understood by reference to the following detailed description, taken in conjunction with the accompanying drawings.

BRIEF DESCRIPTION OF THE DRAWINGS

FIG. 1 shows a perspective view of a segment of a removable panel assembly constructed from a composite shielding of the present invention.

FIG. 2 shows an end view of the panel assembly in FIG. 1 with portions broken thy component layers.

FIG. 3 shows exploded view of the portion indicated in FIG. 2.

FIG. 4 shows a perspective internal view of the lower half section of the panel assembly in FIG. 1.

FIG. 5 shows a cross-sectional view of the panel assembly in FIG. 1 across line 5—5.

DESCRIPTION OF THE PREFERRED EMBODIMENTS

The present invention relates to a composite shielding article and a method of reducing thermal and radioactive radiation emanating from a system. The term "system" encompasses an equipment unit such as reactor vessel, boiler vessel, holding tank, heat exchanger, separator, polisher, dryer and containment, a conduit such as nozzle and piping, and an associated component such as motor, generator, pump and valve and aggregations and portions thereof containing or connected to a high temperature, high pressure stream, which may include radioactive material. The term "system" also encompasses equipment units, conduits and associated components and aggregations and portions thereof that contain or are connected to a stream at lower temperature and/or pressure containing radioactive material such as, for example, those in a waste treatment area.

In the figures, the system 10 to be insulated is a portion of a piping. As shown in FIG. 1, the composite shielding can be provided onto a system as segments of a removable panel assembly. In FIG. 1, a segment 62 contains a first top section 20 and a second mating lower section 22. A portion of another segment 63 is also shown. It should be noted that the numbered elements and component layers depicted in the drawings are not drawn to scale.

In the composite shielding shown in FIG. 2, the first thermal insulation layer 26 reduces thermal radiation emanating from the system and the shielding layer 34 reduces radioactive radiation emanating from the system.

The first thermal insulation layer 26 is positioned between an inner layer 24 and a first supporting layer 28. The inner layer 24 is the layer in closest proximity to the thermal source of origin, which is system 10. The first supporting layer 28 is positioned between the first thermal insulation layer 26 and a first barrier layer 30. The shielding layer 34 is positioned between the first barrier layer 30 and a second barrier layer 32. A second supporting layer 29 is positioned adjacent to the second barrier layer 32. The composite shielding also contains a second thermal insulation layer 42 between the second supporting layer 29 and an outer layer 38.

The inner layer 24, first and second supporting layers 28, 29 and outer layer 38 can be made of a material suitable for providing structural support for the composite shielding such as, for example, stainless steel or galvanized steel. The preferred material for these layers is stainless steel ("sst."). The more preferred material for these layers in a composite shielding that is installed onto a conduit is 20 gauge ("Ga.") stainless steel.

The supporting layers 28, 29 additionally provide structural support to maintain the functional integrity of the thermal insulation layer(s) 26 and/or 42 and the shielding layer 34 during a seismic event. During a seismic event, the supporting layers further contribute to prevent compression of the thermal insulation layer(s) 26 and/or 42 and contribute to keep the shielding layer 34 stationary.

The first thermal insulation layer 26 comprises a material suitable for maintaining the temperature of the shielding layer 34 below that at which creep of the shield material occurs or that at which thermally-induced changes in the physical properties of the shield material occurs ("creep temperature"). A suitable material is selected from the group consisting of low thermal conductivity materials and metallic reflective materials and combinations thereof. An example of a suitable microporous material includes a microporous mineral-based fiber blanket such as Schuller BTU and Schuller MIN-K brands, obtainable from Schuller, and Microtherm brand quilted and slotted products manufactured in England by Micropore, Ltd. and obtainable from Transco Products Inc. in the United States. Examples of suitable metallic reflective materials include stainless steel or galvanized steel. It should be understood that this layer 26 would not be a necessary component of the composite shielding if the system does not reach an operating temperature near or above the creep temperature of the shield material 34. The term "operating temperature" is the temperature of the system under operating conditions. In FIG. 2, the operating temperature is the temperature at the surface 12 of the piping 10.

The shielding layer 34 comprises a shield material capable of reducing the radioactive radiation emanating from the system. Radioactive radiation can be characterized as one of two forms of radiation: particle radiation and wave radiation. An example of a radioactive particle radiation is neutron radiation. Examples of radioactive wave radiation include gamma ray and x-ray radiation.

Shield materials capable of moderating and attenuating particle radiations include materials containing a high level of hydrogen and/or a high level of boron at the temperature of the shielding layer. Although not wishing to be bound, it is believed that materials containing hydrogen serve to moderate radioactive particles and materials containing boron serve to absorb radioactive particles. Examples of suitable hydrogen-containing materials include, but are not limited to, polymers such as polyethylene, materials such as concrete, and hydrated materials such as chrysotile asbestos. Chrysotile asbestos is a hydrous magnesium silicate crystal that retains about 13 to about 15 weight percent of water in the crystallized structure. Examples of boron-containing materials include, but are not limited to, borated polyethylene, borated concrete and boron-containing chrysotile asbestos. This shield material may be provided in the form of polymer or composite structures bearing the hydrogen- and/or boron-containing material. Preferred shield materials for moderating and attenuating radioactive particles contain a high concentration of both boron and hydrogen.

A specific example of a shield material for moderating and attenuating neutron particles is described in U.S. Pat. No. 4,303,553, issued to Aoki et al., the relevant teachings of which are incorporated herein by reference. According to Aoki et al., a neutron protection thermal insulation material is obtained by adding a boron compound and, if necessary, a hydrous compound, to chrysotile asbestos fibers. To form the material, the asbestos is opened with the use of a surface active agent in the presence of water. A boron compound, such as metal boron, boron carbide, boron nitride, boric acid, is added and air bubbles are incorporated into the mixture. Examples of suitable hydrous compounds that can be added to the mixture include magnesium hydroxide with a water content of 31% by weight, aluminum hydroxide with a water content of 35% by weight, ferrous hydroxide with a water content of 20% by weight, ferric hydroxide with a water content of 25% by weight, titanium hydroxide with a water content of 31% by weight, and hydrous salts such as boric acid with a water content of 39% by weight and magnesium borate with a water content of 14 to 30% by weight as well as hydrous minerals such as alumina cement hydrate with a water content of 20 to 25% by weight. The mixture is then dried, molded, and compressed. Preferably, the amount of binder should be restricted to less than 20% in order to maintain high contents of boron and hydrogen in the mixture.

Shield materials capable of attenuating radioactive waves include those having a high atomic weight. High atomic weight ("high-Z") materials include lead, uranium, tungsten, alloys of lead, uranium and tungsten, and combinations thereof. An example of an uranium suitable as a shield material for radioactive waves is often called "depleted uranium," which is uranium with the percentage of uranium 235 lowered to about 0.2%. Preferably, the shielding layer comprises lead or depleted uranium. Lead is the more preferred shield material because it is easier to process and available at a low cost. Commercially available lead is about 99 percent pure and may contain other metals such as, for example, tin, antimony, silver and copper.

The shield material for attenuating x-ray and gamma ray may be in the form of sheets or metal powder in ceramic mortars and blocks, and polymer or elastomer composite structures bearing high-Z materials that are stable at the temperature of the shielding layer. For example, the brand DS Lead, of Sherrit Gordon Mines, Ltd., is a dispersion-strengthened lead containing up to 1.5% lead monoxide evenly distributed through the structure. The oxide combines chemically with the lead, doubling the strength and stiffness of the metal, but increasing its brittleness. Another suitable lead product is a neoprene-lead fabric of Raybestos-Manhattan, Inc. Neoprene-lead fabric is a neoprene fabric impregnated with lead powder. A third example of a suitable lead product is a shielding cement, which is a metallic mortar containing a high percentage of lead powder with ceramic oxides as binders and other elements for selective shielding. The ingredients are mixed with water to form plasters or for casting into sections and blocks. The formulation of the shielding layer 34 varies with the intended use for capture, attenuation, or dissipation of neutrons, gamma rays, x-rays and other radioactive radiation. Therefore, for example, the density of lead present in the shielding layer depends upon the desired shielding effect.

It should be understood that, depending upon the composition of the shield material, the shielding layer may also contribute to thermally insulate the system 10.

Preferably, an oxide layer is allowed to form on the surface of the shielding layer containing lead. The oxide layer naturally results from a chemical reaction between lead and oxygen in the air. It has been found that this oxide layer provides an additional physical barrier to prevent chemical and galvanic interaction between the lead and stainless steel piping and component layers.

It should be understood that the shield material may also comprise a combination of, for example, a high-Z material and a hydrogen- and/or boron-containing material.

Barrier layers 30, 32 comprise a material that is resistant to high temperatures and is suitable for physically separating the shielding layer 34 from supporting layers 28, 29 to prevent chemical as well as galvanic interaction of the shield material with other component layer(s) of the composite shielding and/or surface 12 that may structurally deteriorate the component layer(s) and/or surface 12. As such, these materials are impervious to fine particles generated from the shield material, such as lead powder, during operation of the plant systems. It is especially important to maintain physical separation when the shield material is lead, since low melting point metals such as lead chemically react with stainless steel in the piping surface 12 or in any component layers comprising stainless steel to cause stress corrosion cracking on the stainless steel. The term "galvanic interaction" describes the reaction resulting in corrosion cracking.

Preferably, barrier layers 30, 32 comprise a flexible material. Examples of suitable flexible materials include textiles manufactured from inorganic fibers such as chrysotile asbestos, glass wool, ceramic fibers, silica or silicate mineral fibers, aramids and metal fibers. Aramids are synthetic fibers produced from long-chain polyamides and having a structure in which about 85 percent of the amide linkages are attached directly to aromatic rings. Examples of aramids include Nomex and Kevlar brands from Du Pont Company, and Twaron brand from Akzo NB. The more preferred material for barrier layers 30, 32 include silica mineral fibers or aramids impregnated with silicon. In a preferred embodiment of the invention, the barrier layers 30, 32 overlap each other at their seams to completely encase the shielding layer 34 of each section 20, 22.

It should be understood that barrier layers 30, 32 may not be necessary component layers of a composite shielding article that is used to shield solely radioactive particles such as neutrons.

In a preferred embodiment, a second thermal insulation layer 42 can be placed between the second supporting layer 29 and the outer layer 38 to further thermally insulate the system 10. This layer 42 can be comprised of the same material previously described for the first thermal insulation layer 26. When the composite shielding contains both the first and second insulation layers, it is preferred that the first insulation layer 26 comprises a microporous material and the second insulation layer 42 comprises a plurality of foil layers made of a metallic reflective material such as stainless steel or galvanized steel.

Preferably, the foil layers 42 comprise stainless steel having a thickness of between about 0.001 and about 0.02 inches. The more preferred thickness of the foil layers is about 0.002 inches. The number of foil layers 42 can range between about 2 and about 10. In a preferred embodiment of the invention, about 3 foil layers are provided per inch of thickness. In FIG. 3, the drawing is exaggerated to show five foil layers 42.

End pieces 46, 48 comprise a material suitable for providing structural support for the composite shielding section 20 or 22. End pieces 46, 48 may comprise materials such as galvanized steel or stainless steel. The preferred end pieces comprise stainless steel. The more preferred end pieces comprise solid 20-Ga. stainless steel, which enables the composite shielding assembly to withstand seismic events and operational stresses.

The total thickness of the composite shielding is limited by the amount of space available around a system and the amount of load the system is able to support. The thickness of the thermal insulation layer 26 also depends on its thermal conductivity property. The thickness of the first thermal insulation layer 26 should be sufficient to maintain the temperature of the shielding layer 34 below the melting point of the shield material. When the shield material is a high-Z material, the preferred thickness of the thermal insulation layer should be sufficient to maintain the temperature of the shielding layer 34 below the creep temperature of the shield material. The thickness ratio of a shielding layer 34 made of lead and the first thermal insulation layer 26 made of microporous mineral-based fiber material can range from about 0.25 inches to about 2.0 inches. Preferably, the thickness ratio of a lead shielding layer 34 and mineral-based fiber material thermal insulation layer 26 is about 2:1.

It should be understood that where the system does not require thermal insulation, the thermal insulation layers 26, 42 would not be necessary component layers in the composite shielding of the present invention.

The method of reducing thermal and radioactive radiation emission includes installing the previously described composite shielding onto a system. As previously mentioned, the composite shielding illustrated in FIG. 1 can be provided onto a system as segments of a removable panel assembly. Each section 20, 22 of the composite shielding segment 62 is terminated by circumferential 46 and longitudinal 48 end pieces. As shown in FIGS. 3–5, end laps 50 and circumferential laps 64 are provided on the terminal ends of the segment 62 and sections 20, 22 to cover the seams of section 20 when it is mated with section 22 and seams of segment 62 when it is mated with another segment 63. In the first section 20, end laps 50 are attached to the outer layer 38 along both longitudinal end pieces 48. In both sections 20, 22, circumferential laps 64 are attached to the outer layer 38 along the outer edges of one circumferential end piece 46. As shown in FIG. 1, the segments 62, 63 are installed by mating a first segment's circumferential end piece with the circumferential lap 64 with a second segment's circumferential end piece that is without the circumferential lap.

In a preferred embodiment of the present invention, spacing limitations between said shielding layer 34 and the supporting layers 28, 29 adjacent to said barrier layers are provided to prevent fretting and generation of shield material powder by-products during operational steady state vibration of the shielded plant system or component. Preferably, the distance between said shielding layer 34 and each supporting layer 28 or 29 is between about 0.0625 to about 0.125 inches.

Spacers or the alternative such as wedges can be used to provide a gap between the composite shielding assembly and the piping surface 12 and allow the composite shielding assembly to conform to the shape of, or fit, the system. In FIGS. 4 and 5, spacers 60 are provided between the system 10 and the composite shielding assembly.

As shown in FIG. 1, fasteners such as buckles 52 and 54 may be provided to secure the sections and segments together. In addition, handles 56 can be provided to facilitate removal of the shielding assembly to allow access to the system 10.

Spot-welding, seam-welding, screws, rivets and the like are preferably provided at all butt-joints and adjoining ends of layers to structurally support the component layers of the composite shielding especially during plant system operation and possible seismic disturbances. For example, the inner layer longitudinal end pieces 48 can be spot-welded to the inner layer 24. The outer layer 38 can be riveted to the longitudinal end pieces 48.

While the composite shielding shown in FIG. 2 is made of the top 20 and lower 22 sections containing the same number of component layers, it should be understood that each section can contain different numbers of component layers having different material compositions as required by the system. Moreover, geometric shapes of the segments and sections preferably conform to the system to be insulated, such as elbows and valves.

The invention is further described with reference to the following examples, which are intended to illustrate certain aspects of the invention, without limiting its broader scope.

EXAMPLES

Example 1

A prototype shielding structure having the component layers with corresponding material compositions and thicknesses listed in Table I was installed on a piping having an outer diameter of about 24 inches. The shielding structure was about 1 foot in length and consisted of two half sections.

TABLE I

| Component Layer | Material Composition | Thickness (inch) |
| --- | --- | --- |
| inner layer | 20 Ga. sst. | 0.0359 |
| thermal insulation layer | microporous mineral-based fiber blanket | 0.25 |
| shielding layer | commercial grade lead | 0.50 |
| supporting layer | 24 Ga. sst. | 0.0239 |
| outer layer | 20 Ga. sst. | 0.0359 |
| longitudinal end pieces | solid 20 Ga. sst. | 0.0359 |
| circumferential end pieces | solid 20 Ga. sst. | 0.0359 |
| circumferential and longitudinal laps | 20 Ga. sst. | 1.0 |
| spacers | 20 Ga. sst. | 0.0359 |

The distance between spacers measured about 3 inches. Spot-welding and rivets were provided so that the distance between spot-welds, between rivets, and between rivets and spot-welds measured from about 0.5 up to no more than about 1.5 inches.

The commercial grade lead was obtained from the company Nuclead.

The installed prototype structure was placed upon a shake table and subjected to laboratory seismic testings.

Both operating basis earthquake ("OBE") and safe shut-down earthquake (SSE) were evaluated. OBE is the seismic level that the structure could withstand for safe operation of the system. The prototype is deemed to be "qualified" or can "withstand" a seismic level ("qualified seismic level") for OBE when it does not sustain structural damage at the qualified seismic level. SSE is the seismic level that the structure could withstand and still allow the system to be shut-down safely. The prototype is deemed to be "qualified" or can "withstand" a qualified seismic level for SSE when it does not become unsecured from, or fall off of, the piping at the qualified seismic level. The shake is quantified in terms of its frequency, measured in Hertz ("Hz"), and its force at the peak acceleration, which is measured in gravity units ("G"). The magnitude of 1 G is defined as that of the earth's gravitational force.

Analysis of the tests was based upon the measured accelerations of the shake from the accelerometer mounted on the prototype and inside the piping, examination of the structural integrity of the prototype, as well as observations from viewing a videotape recording of the test. The seismic level is the lesser value between the peak acceleration from the accelerometer on the structure to the peak acceleration from the accelerometer inside the piping.

Four seismic testing methods were used to qualify the prototype, i.e.: measure the maximum seismic level "qualified seismic level", measured in G, that the structure could withstand. The description and results of these tests are detailed in Table II.

The Random Multifrequency test involves shaking the tested structure at random frequencies in each of the three orthogonal directions (vertical, longitudinal, and axial).

The IEEE 382 test is a series of Required Input Motion ("RIM") tests as prescribed in IEEE 382-1985. For an OBE evaluation, this test prescribes a single axis sine sweep tests with a maximum acceleration of 3.0 G at the higher frequencies (above 8 Hz). For a SSE evaluation, this test prescribes a prescribed sine curve with a maximum acceleration of 4.5 G at the higher frequencies (above 8 Hz). A "Sine Sweep" denotes a situation in which the prototype is subjected to a lower frequency and then is subjected to an incremental higher frequency until a designated high frequency, in this case above 8 Hz, is reached.

Any one of the tests described above could have been used to qualify the prototype. The fact that the prototype withstood all of these test leads one to conclude that the prototype structure can withstand a seismic level of at least about 7 G for at least SSE.

Example 2

Segments of composite shielding containing the component layers with corresponding material compositions and thicknesses listed in Table III were installed around conduits including piping and nozzles, and related components including valves of the recirculation system for a boiling water reactor ("BWR") reactor. The composite shielding was designed to withstand a temperature of about 600° F. The operating temperature for the coolant pipe surface is-about 550° F. Each segment consisted of two half-sections.

TABLE II

| Test | Description | Duration | Qualified seismic level |
| --- | --- | --- | --- |
| Sine Dwell single axis test OBE and SSE | Sine Dwell at 6 Hz, single axis test for vertical ("V"), axial ("A") and longitudinal ("L") directions. Table accelerations should equal the following. OBE: V = 1.0 G; A = 1.0 G; L = 1.0 G SSE: V = 2.0 G; A = 2.0 G; L = 2.0 G | OBE - 6 shakes, at 30 seconds each. SSE - 2 shakes at 30 seconds each. | expected seismic levels of 1.0 G OBE for each orthogonal direction; 2.0 G SSE for each orthogonal direction |
| Shake Table Maximum Sine Dwell Input OBE and SSE | Sine Dwell at 7 Hz, single axis test for V, A, L directions. | OBE - 6 shakes at 30 seconds each. SSE - 2 shakes at 30 seconds each. | expected seismic levels of 3.0 G vertically and laterally, and 2.0 G longitudinally |
| Shake Table Maximum Random Multifrequency Input. OBE and SSE | Three direction excitation at random frequencies. | OBE - 6 shakes at 30 seconds each. SSE - 2 shakes at 30 seconds each. | OBE and SSE are minimally 7 G in each of the orthogonal directions |
| IEEE 382 RIM Test OBE and SSE | Generic test defined by IEEE | Pursuant to IEEE 382 | OBE maximum acceleration of 3.0 G at above 8 Hz SSE maximum acceleration of 4.5 G at above 8 Hz |

In Table II, the "Sine Dwell" denotes a situation in which the prototype is subjected to a forcing function at a single frequency. For example, in the "Sine Dwell single axis test," the prototype was subjected to listed forcing function in the corresponding single axis direction for OBE and SSE. Thus, for example, for the OBE evaluation, a first run was performed at a forcing function having a peak acceleration of 1.0 G in the vertical direction, a second run was performed at a forcing function having a peak acceleration of 1.0 G in the axial direction and a third run was performed at a forcing function having a peak acceleration of 1.0 G in the longitudinal direction.

TABLE III

| Component Layer | Material Composition | Thickness (inch) |
| --- | --- | --- |
| inner layer | 20 Ga. sst. | 0.0359 |
| thermal insulation layer | microporous mineral-based fiber blanket | 0.25 |
| first supporting layer | 20 Ga. sst. | 0.0359 |
| first barrier layer | Alpha-maritex brand Style #8459-2-SS fiber glass fabric | 0.037 |
| shielding layer | commercial grade lead | 0.50 |
| second barrier layer | Alpha-maritex brand Style #8459-2-SS | |

TABLE III-continued

| Component Layer | Material Composition | Thickness (inch) |
|---|---|---|
| | fiber glass fabric | |
| second supporting layer | 20 Ga. sst. | 0.0359 |
| foil layers | sst. | 0.002 |
| outer layer | 20 Ga. sst. | 0.0359 |
| longitudinal end pieces | solid 20 Ga. sst. | 0.0359 |
| circumferential end pieces | solid 20 Ga. sst. | 0.0359 |
| circumferential and longitudinal laps | 20 Ga. sst. | 1.0 |
| spacers | 20 Ga. sst. | 0.0359 |

An oxide layer resulting from the chemical reaction of lead and oxygen in the atmosphere was present on the lead surfaces. The first and second barrier layers formed an envelope having overlapping seams to completely encase the shielding layers. Spot-welding and rivets were provided so that the distance between spot-welds, between rivets, and between rivets and spot-welds measured from about 0.5 up to no more than about 1.5 inches.

The 20 Ga. stainless steel in the component layers were bright annealed stainless steel having the composition listed in Table IV and were obtained from Joseph T. Ryerson & Son, Inc. in Chicago, IL. In Table IV, "Max" denotes that the a maximum percentage of the component is listed. Otherwise, a range of the component is listed.

TABLE IV

| Component | Composition (%) |
|---|---|
| Carbon(C) | 0.08 Max |
| Manganese (Mn) | 2.00 Max |
| Phosphorus(P) | 0.045 Max |
| Sulfur(S) | 0.030 Max |
| Silicon(Si) | 0.75 Max |
| Chromium (Cr) | 18.00–20.00 |
| Nickel(Ni) | 8.00–10.50 |
| Copper(Cu) | 0.75 Max |
| Molybdenum(Mo) | 0.75 Max |
| Nitrogen(N) | 0.10 Max |

Microporous mineral-based fiber blanket materials such as Schuller BTU and Schuller MIN-K brands, obtainable from Schuller, were found to be comparable to the Microtherm brand quilted and slotted products manufactured by Micropore Ltd. in England and obtainable in the United States from Transco Products Inc. An alternative material to the Alpha-maritex brand was found to be a silicon-impregnated Kevlar brand fabric having a thickness of about 0.04 inches.

For segments on pipings, each segment on the piping had a typical length of 12 inches. Diameters of the segments varied with diameter of the conduits and components. The overall size of the composite shielding were substantially equal to that of the thermal insulation articles previously installed onto the recirculation system, so that no additional space demands were imposed upon the area surrounding the system.

Spacers were provided at as needed for correct installation. In addition, three lateral buckles of the stainless steel locking long reach type and three corresponding strikers were provided per segment. The strikers were attached to the longitudinal lap. Three circumferential buckles of the stainless steel locking long-reach type and three corresponding strikers were provided per 12 inch section. The circumferential buckles were attached to the circumferential lap. The laps were spot-welded to the outer layer. The outer layer was rivetted to the end pieces. The inner layer was spot-welded to the end pieces.

The total thickness of the composite shielding for piping measured about 4 inches. The temperature of the shielding layer was maintained below about 400° F. The sections and segments were installed by placing a first section into position on the pipe and attaching a mating section by engaging and locking the buckle/striker assemblies. The buckle/striker assemblies had a locking tab which prevented accidental opening. In order to unlock the buckle assembly, the locking tab must be depressed in order to release the buckle. Once installed, no gaps were present between the sections and segments.

The structure is believed to be able to withstand seismic levels of at least up to about 7 gravity units ("G") for both OBE and SSE.

While the composite shielding is calculated to provide a true radiation attenuation half-value for the Cobalt 60 isotope, the actual in-plant effectiveness decreases radioactive radiation by a factor of from about one up to about ten times the theoretical calculated effectiveness for Cobalt-60 isotope. This radioactive radiation reduction benefit is about two to about five times better than typical temporary lead blankets. In addition, the composite shielding has been shown to also provide slightly better thermal insulation than the commercially available metallic thermal reflective insulation blocks.

This assembly has been demonstrated to comply with the United States Nuclear Regulatory Commission regulation 10 C.F.R. § 50.59 ("CFR provision") and Reg. Guide 1.36 ("Reg. Guide provision") for nuclear safety-related plant systems, and therefore can be installed as a permanent plant structure. The CFR provision requires that a modification made in a nuclear reactor plant system does not affect the function or design of the system and satisfies safety analysis. Satisfying the safety analysis involves determining that the risk of occurrence of the accidents such as lost coolant, main steam line break, rod ejection and loss of off-site power is not increased as a result of the modification. Seismic qualification and load limitations of the system have to be met in order to satisfy the CFR provision.

The Reg. Guide provision requires that a thermal insulation installed onto a reactor grade stainless steel piping contain materials that are compatible with the reactor grade stainless steel. The composition of the component layers listed in Table III were determined to be compatible with reactor grade stainless steel.

The effectiveness of the shielding at the power station unit has been shown to reduce radioactive radiation exposure to such a degree such that future Reactor Recirculation System chemical decontaminations can be eliminated at a savings of $1.5M/cycle of operation and maintenance costs and 10 days critical path/cycle ($1.6M/cycle replacement power cost).

Therefore, in a preferred embodiment of the present invention, the composite shielding for permanently reducing thermal and radioactive radiation emanating from a system includes a plurality of component layers, the component layers comprising at least one inner layer; at least one first thermal insulation layer adjacent to said inner layer, said thermal insulation layer consisting essentially of a microporous material or a metallic reflective material; at least one first supporting layer adjacent to said thermal insulation layer; at least one first barrier layer adjacent to said supporting layer; a shielding layer adjacent to said first barrier layer, the shielding layer consisting essentially of a shield material selected from the group consisting high atomic weight material, high hydrogen-containing materials, high boron-containing materials and combinations thereof; at least one second barrier layer adjacent to said shielding layer; at least one second supporting layer adjacent to said second barrier layer; a plurality of foil layers adjacent to said second supporting layer; at least one outer layer adjacent to said foil layers, wherein the inner, supporting, foil and outer layers consist essentially of a metallic reflective material stainless steel said first and second barrier layers forming an enclosure to substantially encase said shielding layer and prevent chemical and galvanic interaction between said shielding layer and said metallic reflective component layers.

The preferred composite shielding for reducing radioactive radiation emanating from a system includes all of the above-described component layers except for the thermal insulation layers.

Of course, it should be understood that a wide range of changes and modifications can be made to the preferred embodiment described above. It therefore is intended that the foregoing detailed description be regarded as illustrative rather than limiting and that it be understood that it is the following claims, including all equivalents, which are intended to define the scope of this invention.

What is claimed is:

1. A composite shielding for reducing thermal transfer and radioactive radiations emanating from a system, said shielding comprising:

at least one first supporting layer and at least one second supporting layer;

a shielding layer comprising a shield material that reduces said radioactive radiation, wherein said shielding layer is located between at least one first supporting layer and at least one second supporting layer;

at least one inner layer and at least one outer layer such that said first and second supporting layers are located between said inner and outer layers;

at least one first thermal insulation layer located between said inner layer and said shielding layer comprising a low thermal conductivity material a microporous mineral fiber-based material;

a plurality of second thermal insulation layers located between said shielding layer and said outer layer comprising a metallic reflective material, and said shielding being adapted for installation next to said system.

2. The shielding of claim 1 further comprising:

at least one first barrier layer between said first supporting layer and said shielding layer; and at least one second barrier layer between said second supporting layer and said shielding layer.

3. The shielding of claim 2 wherein said barrier layers form an enclosure that substantially encases said shielding layer.

4. The shielding of claim 2 wherein said first and second barrier layers comprise a high-temperature flexible material impervious to fine particles.

5. The shielding of claim 4 wherein said flexible material comprises components selected from the group consisting of chrysotile asbestos, glass wool, ceramic fibers, silica mineral fibers, silicate mineral fibers, aramids, metal fibers and combinations thereof.

6. The shielding of claim 2 wherein said barrier layers comprises silicon impregnated in a material selected from the groups consisting of silica mineral fibers, silicate mineral fibers, aramids, metal fibers and combinations thereof.

7. The shielding of claim 1 further compromising at least one first thermal insulation layer is located between said system and said shielding layer.

8. The shielding of claim 7 wherein said first thermal insulation layer and said shielding layer has a thickness ratio of about 2:1.

9. The shielding of claim 1 wherein the shielding layer comprises a shield material selected from the group consisting of high atomic weight materials, high hydrogen-containing materials, high boron-containing materials and combinations thereof.

10. The shielding of claim 1 wherein the shield material is selected from the group consisting of lead, uranium, depleted uranium, tungsten, alloys of lead, tungsten, uranium, depleted uranium and combinations thereof.

11. The shielding of claim 10 wherein said shield material is lead.

12. The shielding of claim 1 wherein the shield material is a selected from the group consisting of polymers, hydrated materials, concrete, borated materials and combinations thereof.

13. The shielding of claim 1 further comprising an in-plant insulation effectiveness of from about one up to about ten times the true half value for Cobalt 60 isotope.

14. The shielding of claim 1 wherein said shielding withstands seismic levels of at least up to about 7 G.

15. A composite shielding for permanently reducing thermal and radioactive radiation emanating from a system, said shielding including a plurality of component layers comprising:

at least one inner layer comprising a metallic reflective material;

at least one first thermal insulation layer adjacent to said inner layer, said first thermal insulation layer comprising an insulation material selected from the group consisting of low thermal conductivity materials, metallic reflective materials and combinations thereof;

at least one first supporting layer adjacent to said first thermal insulation layer;

at least one first barrier layer adjacent to said supporting layer;

a shielding layer adjacent to said first barrier layer, said shielding layer comprising a shield material that reduces said radioactive radiation;

at least one second barrier layer adjacent to said shielding layer;

at least one second supporting layer adjacent to said second barrier layer;

at least one outer layer adjacent to said second supporting layer, said outer layer comprising a metallic reflective material;

said shielding layer having a plurality of shielding surfaces, said shielding surfaces being coated with an oxide layer;

said first and second barrier layers forming an enclosure to substantially encase said shielding layer and prevent chemical and galvanic interaction between said shielding layer with said metallic reflective component layers and the system.

16. The shielding of claim 15 further comprising at one second thermal insulation layer between said second supporting layer and said outer layer, said second thermal insulation layer comprising an insulation material selected from the group consisting of low thermal conductivity materials, metallic reflective materials and combinations thereof.

17. The shielding of claim 15 wherein at least one of said first and second supporting layers comprise a metallic reflective material.

18. The shielding of claim 15 wherein said first thermal insulation layer comprises a microporous mineral fiber-based material.

19. The shielding of claim 15 wherein at least one of said first and second barrier layers comprise a flexible material selected from the group consisting of chrysotile asbestos, glass wool, ceramic fibers, silica mineral fibers, silicate mineral fibers, aramids, metal fibers and combinations thereof.

20. The shielding of claim 15 wherein at least one of said first and second barrier layers comprise silicon impregnated in a material selected from the groups consisting of silica mineral fibers, silicate mineral fibers, aramids, metal fibers and combinations thereof.

21. The shielding of claim 15 wherein said shield material is selected from the group consisting of high atomic weight materials, high hydrogen-containing materials, high boron-containing materials and combinations thereof.

22. The shielding of claim 21 wherein the shield material is selected from the group consisting of lead, uranium, depleted uranium, tungsten, alloys of lead, tungsten, uranium, depleted uranium and combinations thereof.

23. The shielding of claim 21 wherein said shield material is lead.

24. The shielding of claim 23 further comprising an in-plant insulation effectiveness of from about one up to about ten times the true half value for Cobalt 60 isotope.

25. The shielding of claim 24 wherein said first thermal insulation layer and said shielding layer has a thickness ratio of about 2:1.

26. The shielding of claim 21 wherein the shield material is selected from the group consisting of polymers, hydrated materials, concrete, borated materials and combinations thereof.

27. The shielding of claim 15 wherein said shielding layer and said first and second supporting layers are positioned adjacent to said first and second barrier layers such that the distance between said shielding layer and said supporting layers is between about 0.0625 to about 0.125 inches.

28. The shielding of claim 15 wherein said shielding withstands seismic levels of up to about 7 G.

29. A method for reducing thermal transfer and radioactive radiation emanating from a system, said method comprising the steps of:
providing a composite shielding in a plurality of segments, wherein each segment comprises a plurality of sections, said composite shielding comprising:
at least one thermal insulation layer;
at least one supporting layer;
a shielding layer comprising a shield material; and
at least one barrier layer adjacent said shielding layer;
said shielding being adapted for installation next to said system;
providing longitudinal lays onto each section for mating said sections together;
providing spacing limitations between said shielding layer and the supporting layers adjacent to said barrier layers for preventing fretting and generation of shield material powder during steady state vibration.

30. The method of claim 29 wherein the composite shielding is provided on a permanent basis to the system.

31. The method of claim 29 further comprising the step of providing solid stainless steel end pieces at terminal ends of the composite shielding.

32. The method of claim 29 further comprising the step of providing fasteners for securing said segments together.

33. The method of claim 29 further comprising the step of providing a circumferential lap at one terminal end of each segment for mating said segments together.

34. The method of claim 29 further comprising the step of the distance between said shielding layer and said supporting layers between about 0.0625 and about 0.125 inches.

35. A composite shielding for reducing radioactive radiation emanating from a system comprising:
a shielding layer having a surface coated with an oxide layer comprising a shield material that reduces said radioactive radiation between inner and outer layers;
at least one first barrier layer adjacent to said shielding layer;
at least one second barrier layer;
said shielding layer disposed between said first and second barrier layers;
said first and second barrier layers forming an enclosure that substantially encases said shielding layer;
at least one supporting layer adjacent to at least one of said barrier layers.

36. The shielding of claim 35 wherein said shielding layer is located between at least one first supporting layer and at least one second supporting layer.

37. The shielding of claim 35 wherein said barrier layers comprise a flexible material selected from the group consisting of chrysotile asbestos, glass wool, ceramic fibers, silica mineral fibers, silicate mineral fibers, aramids, metal fibers and combinations thereof.

38. The shielding of claim 35 wherein said barrier layers comprise silicon impregnated in a material selected from the groups consisting of silica mineral fibers, silicate mineral fibers, aramids, metal fibers and combinations thereof.

39. The shielding of claim 35 wherein the shielding layer comprises a shield material selected from the group consisting of high atomic weight materials, high hydrogen-containing materials, high boron-containing materials and combinations thereof.

40. The shielding of claim 35 wherein the shield material is selected from the group consisting of polymers, hydrated materials, concrete, borated materials and combinations thereof.

41. A method for permanently reducing radioactive radiation emanating from a system, the method comprising the step of providing a composite shielding comprising:
least one inner layer;
at least one outer layer;
at least one shielding layer between said inner and outer layers, said shielding layer having a surface coated with an oxide layer;
at least one first barrier layer adjacent said shielding layer;
at least one second barrier layer adjacent said shielding layer and opposite said first barrier layer; and
at least one supporting layer.

42. A composite shielding for reducing thermal transfer and radioactive radiations emanating from a system, said shielding comprising:
a plurality of segments wherein each segment comprises a plurality of sections, each of said sections having longitudinal laps for mating sections together, each of said sections comprising:

at least one thermal insulation layer;

at least one supporting layer;

a shielding layer comprising a shield material; and at least one barrier layer adjacent said shielding layer wherein spacing limitations are provided between said shielding layer and the supporting layers adjacent to said barrier layers for preventing fretting and generation of shield material powder during steady state vibration;

said shielding being adapted for installation next to said system.

43. The composite shielding of claim 42 further comprising fasteners for securing the segments together.

44. The composite shielding of claim 42 wherein said thermal insulation layer comprises a thermal insulation material selected from a group consisting of low thermal conductivity materials, metallic reflective materials and combinations thereof.

* * * * *

UNITED STATES PATENT AND TRADEMARK OFFICE
CERTIFICATE OF CORRECTION

PATENT NO. : 5,814,824
DATED : September 29, 1998
INVENTOR(S) : Peter N. Hamby et al.

It is certified that error appears in the above-identified patent and that said Letters Patent is hereby corrected as shown below:

Title Page,
Column 1,
Line 1, under "U.S. PATENT DOCUMENTS", please change "2,928,948" to --2,982,948--.

Claim 1,
Line 15, after "material" please insert --comprising--.
Line 19, after "material" please change "," (comma) to --;-- (semicolon).

Claim 7,
Line 1, please change "compromising" to --comprising--.

Claim 12,
Line 2, please delete "a".

Claim 27,
Line 4, please insert --at least one of said first and second-- before "supporting".

Claim 29,
Line 13, please change "lays" to --laps--.

Claim 41,
Line 4, please insert --at-- before "least".

Signed and Sealed this

Fourteenth Day of August, 2001

*Attest:*

NICHOLAS P. GODICI
*Attesting Officer*    *Acting Director of the United States Patent and Trademark Office*